A. W. DREYFUS.
SPRING SUSPENSION SYSTEM.
APPLICATION FILED JUNE 26, 1913.
1,140,257.
Patented May 18, 1915.
2 SHEETS—SHEET 2.
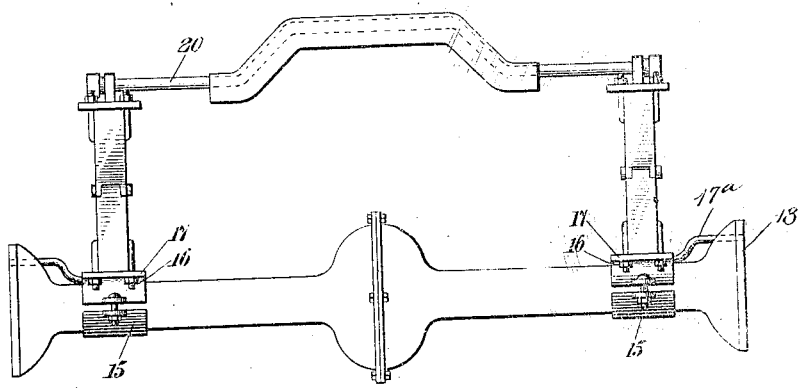
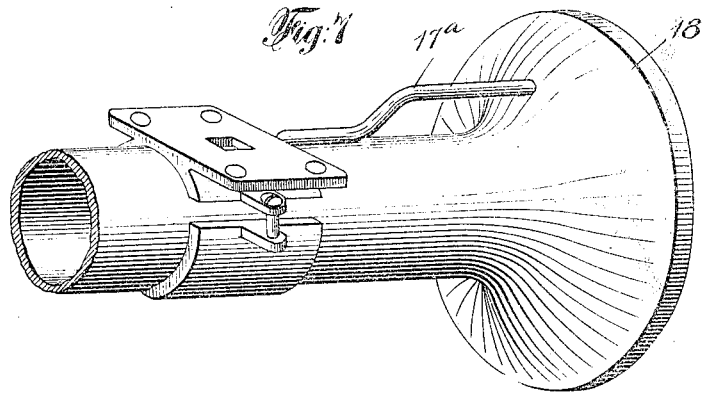

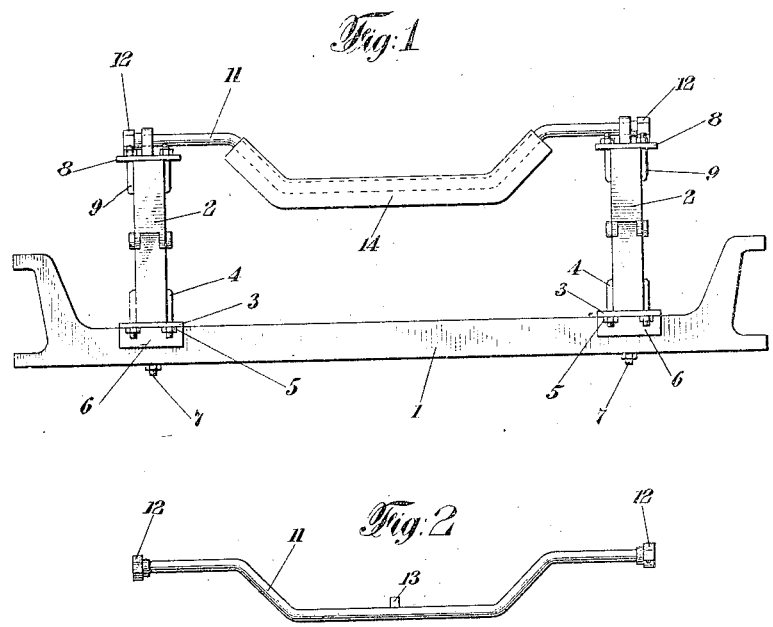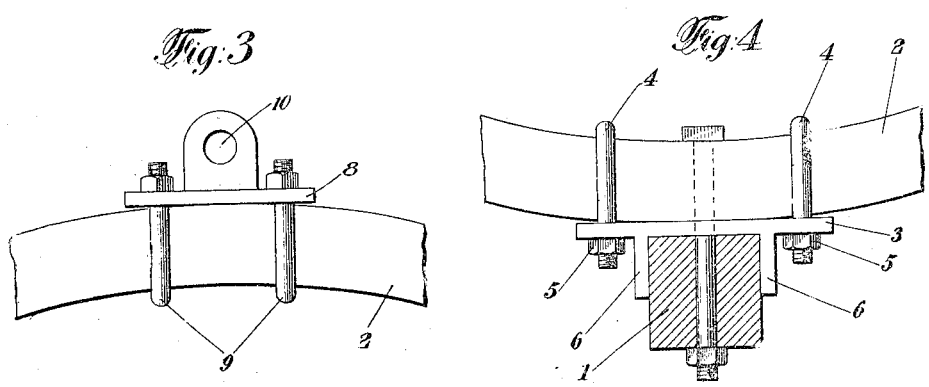

UNITED STATES PATENT OFFICE.

ADOLPHUS WALTERS DREYFUS, OF DELHI, NEW YORK.

SPRING SUSPENSION SYSTEM.

1,140,257. Specification of Letters Patent. Patented May 18, 1915.

Application filed June 26, 1913. Serial No. 775,845.

*To all whom it may concern:*

Be it known that I, ADOLPHUS WALTERS DREYFUS, of Delhi, in the county of Delaware, and in the State of New York, have invented a certain new and useful Improvement in Spring Suspension Systems, and do hereby declare that the following is a full, clear, and exact description thereof.

My invention relates particularly to an improvement in suspension systems for automobiles, although it is capable of being applied to vehicles in general.

The object of my invention is to provide a spring suspension system for bodies of automobiles, which is so designed that it can be substituted for all kinds of cross-springs which are now used on automobiles, so that by making the substitution, full elliptic springs may be provided in the place of the cross-springs.

My improvement is especially applicable to automobiles using single cross-springs as in the case of Ford automobiles, especially those known as Model "T."

By means of my invention, the cross-springs, and especially single cross-springs used upon automobiles, may be readily replaced by a spring suspension system involving full elliptic springs both at the front and rear of the automobile. Furthermore, by means of my invention, the parts known as radius rods used on automobiles, having only a single spring, can be entirely done away with.

While my invention is capable of embodiment in many different forms, for the purpose of illustration I have shown only certain forms thereof in the accompanying drawings, in which—

Figure 1 is a front elevation of a front axle showing my spring suspension system in place; Fig. 2 is a front elevation of the cross arm used in the same; Fig. 3 is an enlarged detail of the upper half of one of the springs showing the bracket carried thereby; Fig. 4 is a similar view of the lower half of the spring showing the bracket attached thereto; Fig. 5 is a rear elevation of my suspension system as applied to the rear axle; Fig. 6 is a similar view of the cross arm used in the same; and, Fig. 7 is a perspective view showing the clamp for attaching the rear spring saddle to the axle.

As shown in the drawings, I have indicated a front axle 1 to which there may be attached a pair of full elliptic springs 2. Each of the springs 2 is connected to the axle 1 by means of a clamping plate 3 which is secured to the spring by means of a pair of yokes 4 having their ends passing through the plate 3 and screw-threaded to receive nuts 5. It will be noted that the lower face of the plate 3 carries a pair of depending flanges 6 to form a recess upon the lower face of the plate 3 which will fit over the axle 1. To secure the plate 3 in place upon the axle 1, I provide a bolt 7 which passes through the center of the plate 3 and the axle 1. Each of the springs 2 carries upon its upper half a plate 8, which is secured to the spring by means of yokes 9 in a similar manner to that in which the plate 3 is secured to the lower half of the spring. Upon its upper face each of the plates 8 is provided with an eye 10 to receive the end of a U-shaped cross arm 11 carrying nuts 12 upon its two ends. The cross arm 11 is preferably made of channel steel and has a depression in the center of the cross arm which adapts it to fit beneath the automobile body so that the system of full elliptic spring suspension may be substituted for the cross-spring suspension. The U-shaped cross arm 11, at its lower portion, may have, if desired, an upwardly directed pin 13 to secure it to the automobile body. As shown in Fig. 1, the cross arm 11 may receive a housing 14 attached to the automobile body.

As shown in Figs. 5, 6 and 7, I may apply my system to a rear axle. In this instance, the construction is the same except in the following respects: The rear axle being usually round in cross-section, I provide at each end thereof a clamping bracket 15 having at the top thereof a horizontal plate 16 to receive a plate 17 which is attached to the lower half of the spring in the manner previously described. In order to be sure that the clamping bracket 15 shall be invariably retained in its proper place, I provide at one side thereof a stud 17ᵃ which extends into a recess in the enlarged end 18 of the axle to which the wheel is pivoted. Furthermore, the cross arm which is used in the spring suspension for the rear axle may be the same in construction as the cross arm 11 used for the front axle, but in this instance the U-shaped cross arm is located in the position of an inverted U. If desired, however, a special cross arm 19 may be used for the rear axle spring suspension, said cross arm 19 being constructed in the same manner as the cross arm 11 already described, except that it is provided with an upwardly directed pin 21 upon the upper side of the inverted U-shaped portion thereof, to locate the body of the automobile in the proper position.

From the description of the construction hereinabove, it will be seen that an automobile having cross-springs may be readily equipped with a full elliptic spring suspension with the springs extending longitudinally of the automobile, by merely substituting my spring suspension system for the cross-springs. In the case of automobiles using single cross-springs, there is only a single attachment from the spring to the body of the automobile, and it therefore becomes necessary, in such constructions, to use lateral braces extending from the running gear to the ends of the axles in order to properly brace them. By means of my invention, the radius rods may be entirely omitted. The construction is such, furthermore, that the same type of suspension may be used for both front and rear axles by merely including the cross arm used upon the front axle suspension system to adapt it for application to the rear axle. If desired, however, as indicated above, special cross arms may be provided adapted only for application to the front and rear axles respectively.

My invention is especially advantageous inasmuch as it can be readily applied to automobiles in a short time and with a minimum of labor. It has been frequently found desirable to provide a more flexible suspension for automobiles having cross-springs, especially in the case where an automobile is being used for long runs, and my system of suspension permits an automobile to be quickly changed from one type to the other with a minimum expenditure of time and labor.

While I have described my invention above in detail, I wish it to be understood that many changes may be made therein without departing from the spirit of my invention.

I claim:

1. A spring suspension comprising a spring and a clamping bracket for attaching it to the axle, the bracket having a stud extending laterally into the axle to hold it in position on the axle.

2. A spring suspension system comprising a U-shaped cross arm, full elliptic springs attached thereto at the top of the springs, and means for attaching the bottoms of the springs to the axle, said means comprising a clamping bracket having a stud extending laterally into the axle to hold it in position on the axle.

3. A spring suspension system comprising a U-shaped cross arm, full elliptic springs attached thereto at the top of the springs, and means for attaching the bottoms of the springs to the axle, the U-shaped cross arm having an upwardly directed pin to attach it to the body, said means comprising a clamping bracket having a stud extending into the axle to hold it in position on the axle.

In testimony that I claim the foregoing I have hereunto set my hand.

ADOLPHUS WALTERS DREYFUS.

Witnesses:
HAMILTON J. HEWITT,
WM. T. BLACK.